April 24, 1962   C. E. RYAN   3,031,572
INFRARED XEROGRAPHY
Filed Nov. 5, 1959

INVENTOR.
CHARLES E. RYAN
BY
ATTORNEYS

United States Patent Office 3,031,572
Patented Apr. 24, 1962

3,031,572
INFRARED XEROGRAPHY
Charles E. Ryan, 155 Aspen Ave., Auburndale, Mass.
Filed Nov. 5, 1959, Ser. No. 851,198
3 Claims. (Cl. 250—65)
(Granted under Title 35, U.S. Code (1952), sec. 266)

The invention described herein may be manufactured and used by or for the United States Government for governmental purposes without payment to me of any royalty thereon.

The present invention relates to Xerography and more particularly to Xerography in the infrared region.

Xerography is a dry printing process in which an optical image is transformed into an electrostatic image by the exposure of a charged photoconductive layer of amorphous selenium. The electrostatic image is developed on the selenium plate by cascading or spraying a powder over the surface of the plate. The powder image is transferred by electrostatic charge to a paper or other substrate and then fixed in place either thermally or by chemical action. There are forms of Xerographic printing and reproduction for which the photoconductive plate is not an essential feature of the Xerographic process in its broadest terms; but for the conversion of an optical image to an electrostatic image a photoconductive medium is essential.

In my related application entitled "Xerographic Photo Conductive Plates," filed on November 5, 1959 and having the Serial No. 851,199, and containing illustrations similar to those presented herein, there is claimed the process for forming and the physical structure of a novel photoconductive plate.

The photoconductive plates prepared and used in the prior art are formed by high vacuum deposition of selenium to a thickness of approximately twenty (20) microns. The resulting film of amorphous selenium on an aluminum backing has certain properties that make it suitable for transforming an optical image focused on its surface into an electrostatic image on its surface. These properties are: (1) the plate must be photoconductive, i.e., the resistance through the film must be a function of the light intensity on the surface; (2) the dark resistance must be sufficiently high so that the electrostatic image will not leak off; (3) the lateral surface resistance must be sufficiently high so that the charge image will not diffuse laterally causing a loss of resolution of the electrostatic image. The selenium plates achieve these objectives except that the sensitivity of the selenium plates is too low for a general purpose camera. The equivalent ASA rating is about 4 while a panchromatic film is about 100. Hence without a substantial improvement in plate sensitivity, the Xerographic camera cannot compete with photographic film cameras as a general purpose camera and is restricted to such applications as a copying camera or a camera for taking picture of still life under bright lighting conditions. The present invention which is described in detail below utilizes a radically new approach to obtaining an extremely high sensitivity photoconductive plate to be used in an electrostatic camera.

The basic limitations in the selenium plate are: first, the spectral response of selenium is inadequate to cover the visible region of the spectrum because of the high energy gap for selenium; secondly, the use of an amorphous material rather than a single crystal material greatly restricts the achievable sensitivity of a photoconductor.

In the prior art, the limit for photo-emissive devices is approximately 1.3 microns. An important feature of the present invention is to extend the infrared range of the Xerograph camera to 7 microns.

In accordance with the present invention a monocrystal body of indium antimonide is utilized. In order to achieve the high dark resistance, a p-n junction is required. This may be formed by a diffusion process. Another technique for achieving area p-n junctions is the surface alloying technique utilizing ionization cleaning. Photocells made by either of these techniques are extremely sensitive but lack the extremely high dark resistance required and the image would leak off both laterally (destroying the resolution) and through the junctions (destroying the sensitivity). A p-n junction used as a photocell is described in vol. II of Transistor Technology published by D. Van Nostrand Co. Inc., in 1958.

In the present invention, the surface of the cell is broken up into a large number of minute p-n junctions; as a result thereof the dark resistance is extremely high and the lateral resolution is good.

An object of the present invention is to provide a novel Xerographic process in which an infrared image is transformed into an electrostatic image.

Another object of the present invention is to provide a novel Xerographic process having greatly increased resolution and sensitivity for an infrared image being transformed into an electrostatic image.

Yet another object of the present invention is to provide an Xerographic process over an increased infrared region.

Still another object of the present invention is to provide an Xerographic process over an increased infrared region resulting in greater sensitivity and resolution.

The various features of novelty which characterize this invention are pointed out with particularity in the claims annexed to and forming part of the specification. For a better understanding of the invention, however, its advantages and objects obtained with its use, reference should be had to the accompanying drawings and descriptive matter in which is illustrated a preferred embodiment of the invention.

Figure 1:
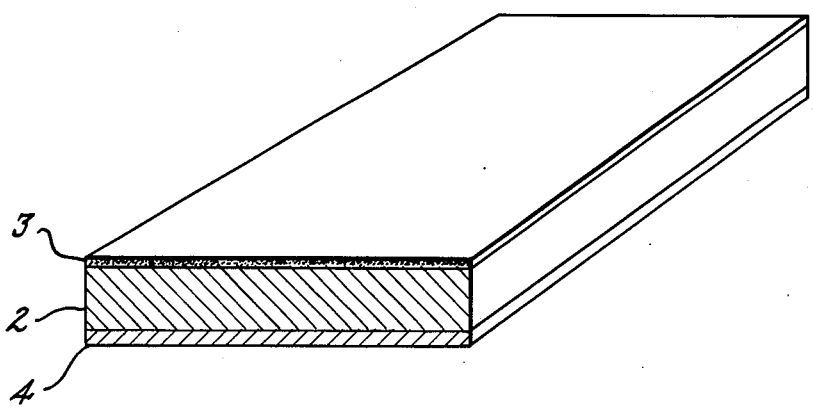
FIGURE 1 shows a photoconductive plate.

More particularly now referring to FIGURE 1, there is shown a photoconductive plate in a unitary structure in which a single crystal body of indium antimonide is utilized. The aforesaid single crystal indium antimonide is in the form of indium antimonide slab 2 which is of the "p" type and is 5 mils in thickness. "N" layer 3 is diffused onto indium antimonide slab 2 to a .01 mil thickness and there is also provided an ohmic substrate 4 which is a "p" doped metal. There is thus provided a photoconductive plate utilizing a single crystal and having a p-n junction which results in greatly increased sensitivity. However, the photoconductive plate lacks the extremely high dark resistance required and the image would leak off both laterally (destroying the resolution) and through the junctions (destroying the sensitivity).

Figure 2:
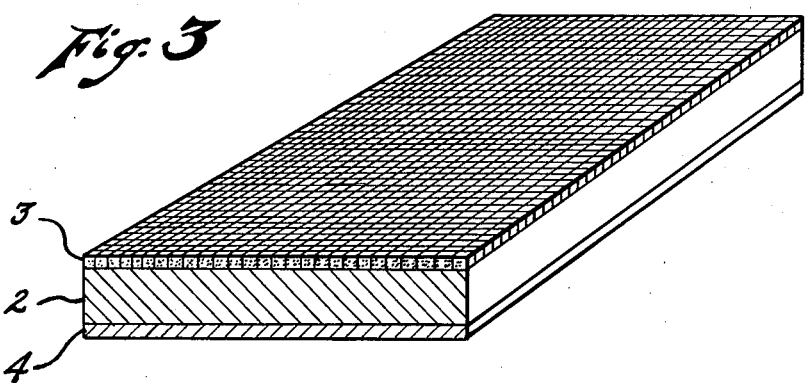
FIGURE 2 illustrates a photoconductive plate having a multitude of minute p-n junctions.

Now referring in greater detail to FIGURE 2, the photoconductive plate that was formed as illustrated in FIGURE 1 has applied thereto a masking and etching technique. The surface of diffused "n" type layer 3 is etched into individual p-n junctions by photoetching through the diffused layer of the unprotected surface. This would permit as high as 1000 elements per inch or $10^6$ junctions per inch square giving a high quality picture (magazine quality half tones are about 120 dots per linear inch and newspaper about 80 dots per linear inch). The surface of photoconductive plate of FIGURE 2 has been broken up into a large number of minute p-n junctions thereby ensuring high resolution and high dark resistance coupled with very high sensitivity.

Instead of a masking and etching process, a very thin layer of gold or aluminum may be evaporated onto indium antimonide surface and by a surface cleaning and heat treatment cycle form myriads of isolated island of entectic which permits the formation of a very large number of minute junctions leading to high resolutions and high dark resistance coupled with very high sensitivity. This permits the use of relatively low charging voltages.

The photoconductive plate containing the single crystal body of indium antimonide has a spectral response to 7 microns well beyond the infrared range of any process or device of the present art.

Figure 3:
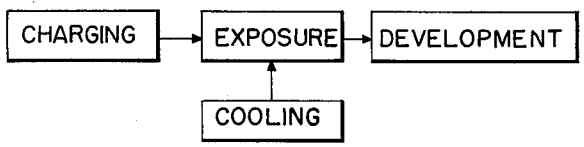
FIGURE 3 shows an operational flow sheet illustrating the successive stages of operation according to one embodiment of the invention.

The photoconductive plate of FIGURE 2 having a single crystal body of indium antimonide is utilized in a dry printing process embodying the present invention and including successive operations, or steps (see FIGURE 3) of charging, exposure and simultaneous cooling followed by development of the charged plate. In performing such a process, a conventional charging voltage is applied to aforesaid photoconductive plate and an infrared image up to the limit of 7 microns is impressed upon the monocrystal photoconductive plate thereby transforming the infrared image into an electrostatic charge. The electrostatic charge is developed on the photoconductive plate by cascading or spraying a powder over the surface of the plate. The powder image is transferred by electrostatic charge to a paper or other substrate and then fixed in place either thermally or by chemical action. An important feature of the aforesaid process is the cooling of the monocrystal photoconductive plate during the period of impressing the infrared image thereupon until the powder image is transferred in order to reduce the dark currents therein.

It is emphasized that the Xerographic process hereinbefore described provides a range up to and including 7 microns. It is possible to provide a range higher than 7 microns with other intermetallic compounds.

What is claimed is:

1. An Xerographic process comprising impressing an infrared image upon a charged monocrystal indium antimonide photoconductive plate having a multitude of minute p-n junctions upon the surface thereof, said impressing of said image occurring under conditions minimizing the currents within said photoconductve plate, covering said surface with a powder, and transferring in permanent form said powder to a substrate.

2. An Xerographic process comprising impressing an infrared image upon a charged monocrystal indium antimonide photoconductive plate having a multitude of minute p-n junctions upon the surface thereof, said impressing of said image occurring under conditions minimizing the currents within said photoconductive plate, spraying said plate with powder, and converting the image created by said spraying into permanent form.

3. An Xerographic process comprising impressing an infrared image upon a monocrystal indium antimonide photoconductive plate having a multitude of minute p-n junctions on the surface thereof, said impressing of said image occurring under conditions minimizing currents within said photoconductive plate, transforming said infrared image impressed on said plate into an electrostatic image on said plate, and converting said electrostatic image into a permanent form.

References Cited in the file of this patent
UNITED STATES PATENTS

| | | |
|---|---|---|
| 2,297,691 | Carlson | Oct. 6, 1942 |
| 2,764,693 | Jacobs | Sept. 25, 1956 |
| 2,817,765 | Hayford | Dec. 24, 1957 |
| 2,859,352 | Sugarman | Nov. 4, 1958 |